US008915342B2

(12) United States Patent
Cook (10) Patent No.: US 8,915,342 B2
(45) Date of Patent: Dec. 23, 2014

(54) DUAL STAGE INPUT LEVER TRANSMISSION DOWNSHIFT SYSTEM

(76) Inventor: David Cook, Novi, MI (US)

(*) Notice: Subject to any disclaimer, the term of this patent is extended or adjusted under 35 U.S.C. 154(b) by 1764 days.

(21) Appl. No.: 12/150,117

(22) Filed: Apr. 24, 2008

(65) Prior Publication Data

US 2009/0270223 A1    Oct. 29, 2009

(51) Int. Cl.
  *B60K 20/06*   (2006.01)
  *B62D 1/04*    (2006.01)
  *B60K 23/02*   (2006.01)

(52) U.S. Cl.
  CPC ........... *B60K 20/06* (2013.01); *B62D 1/046* (2013.01); *B60K 23/02* (2013.01)
  USPC ........................... 192/3.55; 74/473.31

(58) Field of Classification Search
  USPC .......... 192/3.55; 180/336; 200/61.54–61.57; 74/473.31, 473.32, 473.33, 473.35
  See application file for complete search history.

(56) References Cited

U.S. PATENT DOCUMENTS

| | | | | |
|---|---|---|---|---|
| 1,611,757 A | * | 12/1926 | Luplow | 200/61.27 |
| 2,230,891 A | * | 2/1941 | Meyerhoefer | 200/6 A |
| 3,166,950 A | * | 1/1965 | Pomeranz | 74/526 |
| 5,520,066 A | * | 5/1996 | Tueri | 74/484 R |
| 6,073,511 A | * | 6/2000 | Umezawa et al. | 74/473.25 |
| 6,120,412 A | * | 9/2000 | Fujinuma | 477/99 |
| 6,151,977 A | * | 11/2000 | Menig et al. | 74/336 R |
| 6,268,576 B1 | * | 7/2001 | Onodera | 200/61.54 |
| 6,532,841 B2 | * | 3/2003 | Medico et al. | 74/335 |
| 6,948,399 B2 | * | 9/2005 | Yoshikawa et al. | 74/473.12 |
| 7,005,592 B2 | * | 2/2006 | Charnock et al. | 200/61.54 |
| 7,278,510 B1 | * | 10/2007 | Richards | 180/336 |
| 7,762,159 B2 | * | 7/2010 | Takahashi et al. | 74/552 |
| 2002/0066658 A1 | * | 6/2002 | Agetsuma | 200/61.54 |
| 2005/0202932 A1 | * | 9/2005 | Burzio | 477/97 |

* cited by examiner

*Primary Examiner* — Ramya Burgess
*Assistant Examiner* — Terry Chau
(74) *Attorney, Agent, or Firm* — John R. Benefiel (57) ABSTRACT

A two stage clutch and shift actuation paddle assembly provides clutch disengagement through a first range of movement of a manually operated control lever or paddle and electronic shifting of a transmission upon movement through a second range. A return spring force generator causes a lower return force to be exerted on the generator paddle in a range of motion wherein the clutch is disengaged and a pronounced increased spring force to be exerted in advanced range of motion wherein the transmission shift actuation occurs.

3 Claims, 6 Drawing Sheets

DUAL STAGE INPUT LEVER TRANSMISSION DOWNSHIFT SYSTEM

BACKGROUND OF THE INVENTION

This invention relates to the shifting of sequential transmissions in motor vehicles, and relates specifically to a system that allows an operator to shift a sequential transmission by manipulating a control lever.

DESCRIPTION OF THE PRIOR ART

A sequential transmission as it applies to this invention is a transmission which is operated by a gear ratio selection lever that only moves about one axis. This operating lever has only one rest position, and when moved in one direction it selects gearing of a higher ratio and when moved in the opposite direction it selects gearing of a lower ratio. After the lever is moved all the way in either the upshift or downshift direction, the gear ratio changes. When the force that was required to move the lever is released, the lever returns to its static resting position. By comparison, non sequential transmission usually have a lever that moves about two axes as is found in the typical manual transmission automobile. Non sequential manual transmission gear selection levers don't have a single static resting position, but have a unique static lever position for each gear ratio and this allows the operator the freedom to go from one gear ratio to any other gear ratio in the transmission with one motion of the lever. A sequential transmission cannot skip over intermediate gear ratios. To go from the highest gear ratio to the lowest gear ratio the selector lever must be moved repeatedly to engage each individual intermediate gear ratio momentarily.

Most sequential and non sequential transmissions have traditionally been shifted by simultaneously manipulating a transmission shift lever, a clutch lever and the throttle simultaneously. A traditional pedal setup has evolved to control race cars, having three pedals, one each to control the clutch, brakes and throttle. The open wheeled racing car provides an operating environment that makes the traditional pedal system less than optimum in physical dimensions, required attention, and control complexity. Attention and control complexity arise because the drivers have only their two feet available to operate all three pedals.

When slowing a race car down, a driver will have to have one foot on the clutch to downshift the transmission and one on the brake to decelerate the car; there is then a measurable amount of time lost when the driver needs to move his foot form the brake pedal to the accelerator pedal to change from braking to accelerating. Operating both the brake pedal and throttle pedal simultaneously with the same foot is necessary to avoid the previously mentioned lost time or when the driver would like to be accurately applying the brakes while simultaneously applying power to the driving wheels to modify the balance of the car. This is an advanced driving technique and requires lots of practice time and also special placements of the pedals to accommodate the geometry of the driver's anatomy.

Physical dimension issues arise because the three pedal system requires a certain width of space in the nose of the car and in an open wheeled formula car this makes the nose wider which decreases the lengths of the suspension a-arms and the span length of the front wings. Shorter wings with higher aspect to ratios are less efficient and shorter suspension a-arms introduce negative handling aspects the suspension. The traditional shifter lever poses other performance detractions, the driver is distracted as has to remove his hand from the steering wheel to operate the shifter. The shifter lever also adds a requirement for more space in the driver's cockpit area for the lever itself and room for the driver's arm to move as he reaches over to operate it.

Several techniques and innovations have been developed to work around these deficiencies. Currently several professional racing teams have solved many of these problems by going to electronic and computer controlled systems with paddles behind the steering wheel, common are two and three paddle systems that are used to control the transmission and clutch by paddles located just behind the steering wheel that are operated by the driver's fingertips. These systems involve computer control, position sensors, and servos to accurately control the gearshift lever, clutch engagement and engine rpm. This system improves the race vehicle by eliminating the need for a shift lever on the side of the cockpit, room for the driver's arm to control it, and also by removing the need for a clutch pedal in the footbox. The complexity and cost of these systems make them prohibitive for amateur non-professional racers. This system is also currently available on some Ferrari street cars.

Presently available for sequential transmission are affordable paddle and pushbutton controls mounted to the steering wheel that command transmission shift actuators, but do not control the clutch. These actuators are predominately 3 types; electric only, electro hydraulic and electro pneumatic. The electric only actuators use electric solenoids to apply force on the shift lever to move it in the shift direction chosen. The other two systems use an electric signal to control an electric solenoid valve which ten applies hydraulic or pneumatic pressure to an actuator that applies force to the shift lever.

These systems allow the driver to keep his hands on the steering wheel and eliminate the separate shift lever in the cockpit, but do not address the problems associated with the three pedal setup. One college race team has experimented with disengaging the clutch at the same time the transmission was downshifted. This coupling of the clutch and transmission did eliminate the need for the driver to use the clutch, but caused the clutch to be reengaged several times when the transmission had to be downshifted more than one gear. Each reengagement was an opportunity for the driver to make a mistake and cause the car to become unstable while under maximum braking force.

SUMMARY OF THE INVENTION

In accordance with the present invention, a dual stage input paddle transmission downshift system incorporates an input paddle mounted behind the steering wheel that operates a switch which disengages the clutch in one state and continues the clutch disengagement actuation while also commanding a downshift event in a second stage. A dual stage paddle spring return force generator arrangement gives the driver tactile feedback to know at what control stage the input paddle is in. A large and abrupt increase in paddle return spring force is achieved by engagement of a second return spring to give the operator a tactile indication of the position of the paddle that has actuated the vehicle clutch disengagement system prior to activation of the gear downshift actuator.

At the end of the first stage of travel, the driver just has to give the paddle a noticeably harder pull to overcome the second stage spring return force which moves the paddle to its final stop where it actuates the downshift switch and initiates a transmission downshift. After moving the lever completely through both stages, the driver can partially or fully release the paddle. Fully releasing the paddle will first deactivate the downshift switch and then allow it to move back to its extension to stop where it deactivates the clutch switch causing the clutch to reengage.

To partially release the paddle, the driver can just lessen the force he applies to the lever allowing it to return to the position where the spring force abruptly drops which is at the end of the first stage of travel where the clutch switch is still actuated and the clutch is still disengaged, but the downshift switch is now deactivated. The driver holds this lever position keeping the clutch disengaged with a reasonable amount of pressure at this point and can also move the paddle back and forth a small distance to insure he is at the spot between the stages without the clutch re-engaging.

To downshift another gear the driver has to just increase the lever force again overcoming the second stage spring force, actuating the downshift switch again. After pulling the lever all the way to its hard stop, the driver again has the option of a full or partial release. By partially releasing the lever multiple times the driver can do multiple gear downshifts with only one clutch reengagement. The driver will fully release the lever from the partially pulled position when the driver is ready to blip the throttle and smoothly transition the vehicle to the braking effect of the clutch engaged engine.

Accordingly, my invention provides the following advantages:

(a) It allows the driver to concentrate on other aspects of controlling the vehicle by automating the downshift event to a single low concentration and effort input.
(b) It eliminates the necessity for the driver's hands to leave the steering wheel while downshifting the car.
(c) It eliminates the need for a clutch pedal, reducing the needed width of the pedal box and the nose of the car. The lack of a pedal makes the system lighter and cheaper.
(d) It allows a narrower pedal box as mentioned above which in turn enables longer span front wings which generate more performance enhancing down force with less performance robbing drag.
(e) The narrower pedal box mentioned above allows for longer suspension a-arms which allow for improved geometry which improves the vehicle cornering and braking potential.
(f) It allows multiple downshift events with only one clutch re-engagement, each re-engagement requires the driver's attention to manipulate the throttle and engine rpm and is a chance to make a mistake which would unsettle the chassis.
(g) It gives a tactile feel so that the driver would know where the downshift lever was by moving the lever up against the first stage stop and releasing slightly.
(h) It provides an easy to trouble shoot system requiring only springs and single throw single pole switches and not using any position sensors or electronic circuits.
(i) It provides an economical solution for controlling the clutch and transmission shift lever requiring only springs, simple hardware and single throw single pole switches while not using position sensors or electronic circuits.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
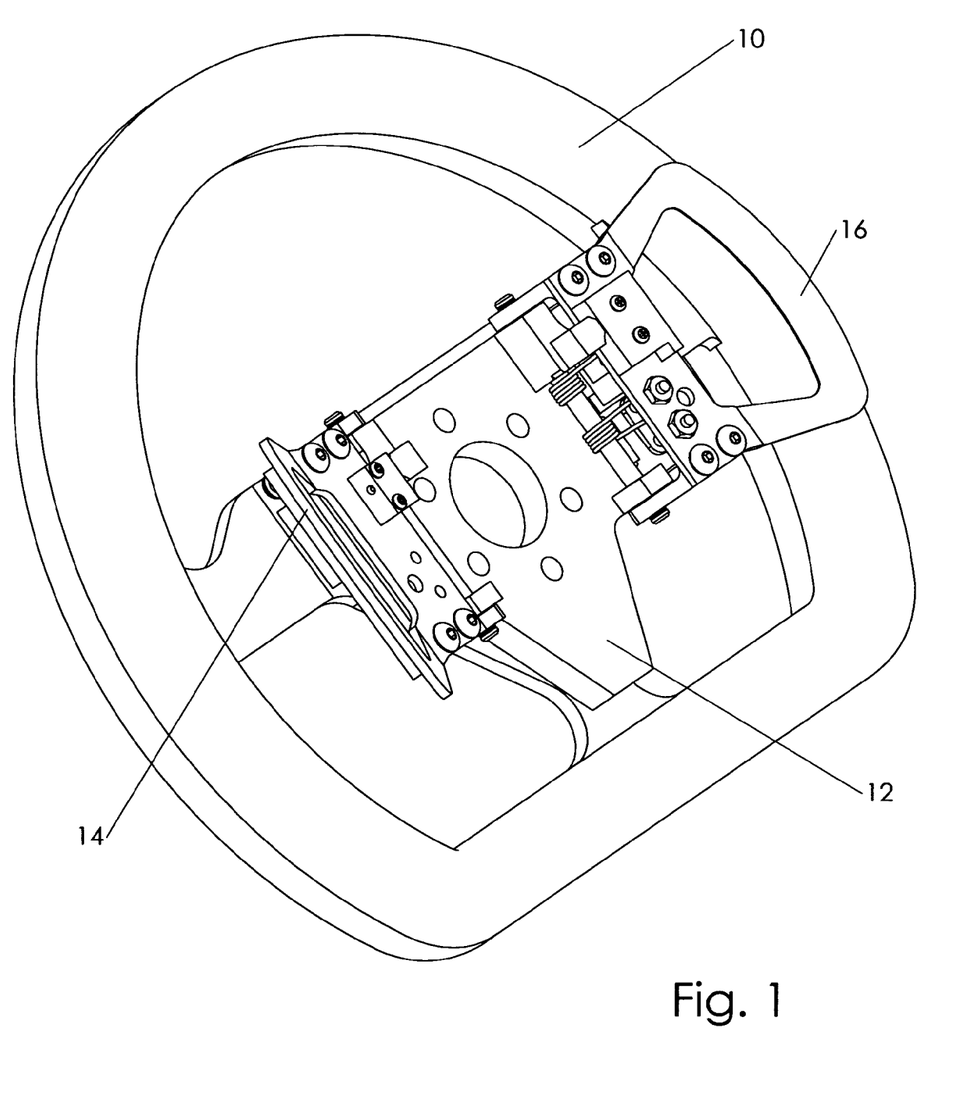
FIG. 1 is a pictorial rear view of a paddle assembly according to the invention mounted to the back of a steering wheel shown from the rear.
Figure 2:
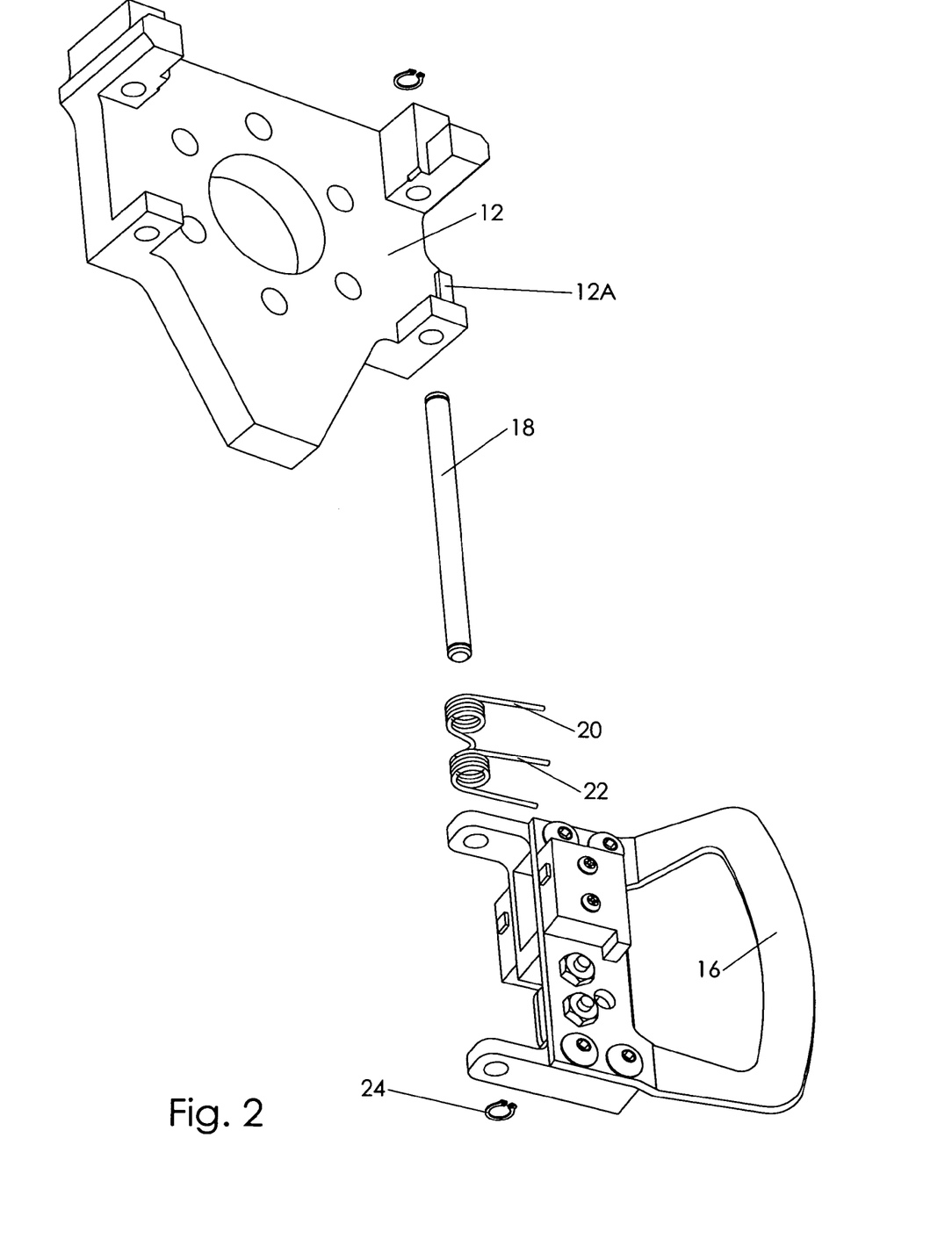
FIG. 2 is an exploded pictorial view of a two stage downshift side of the paddle assembly according to the invention.
Figure 3:
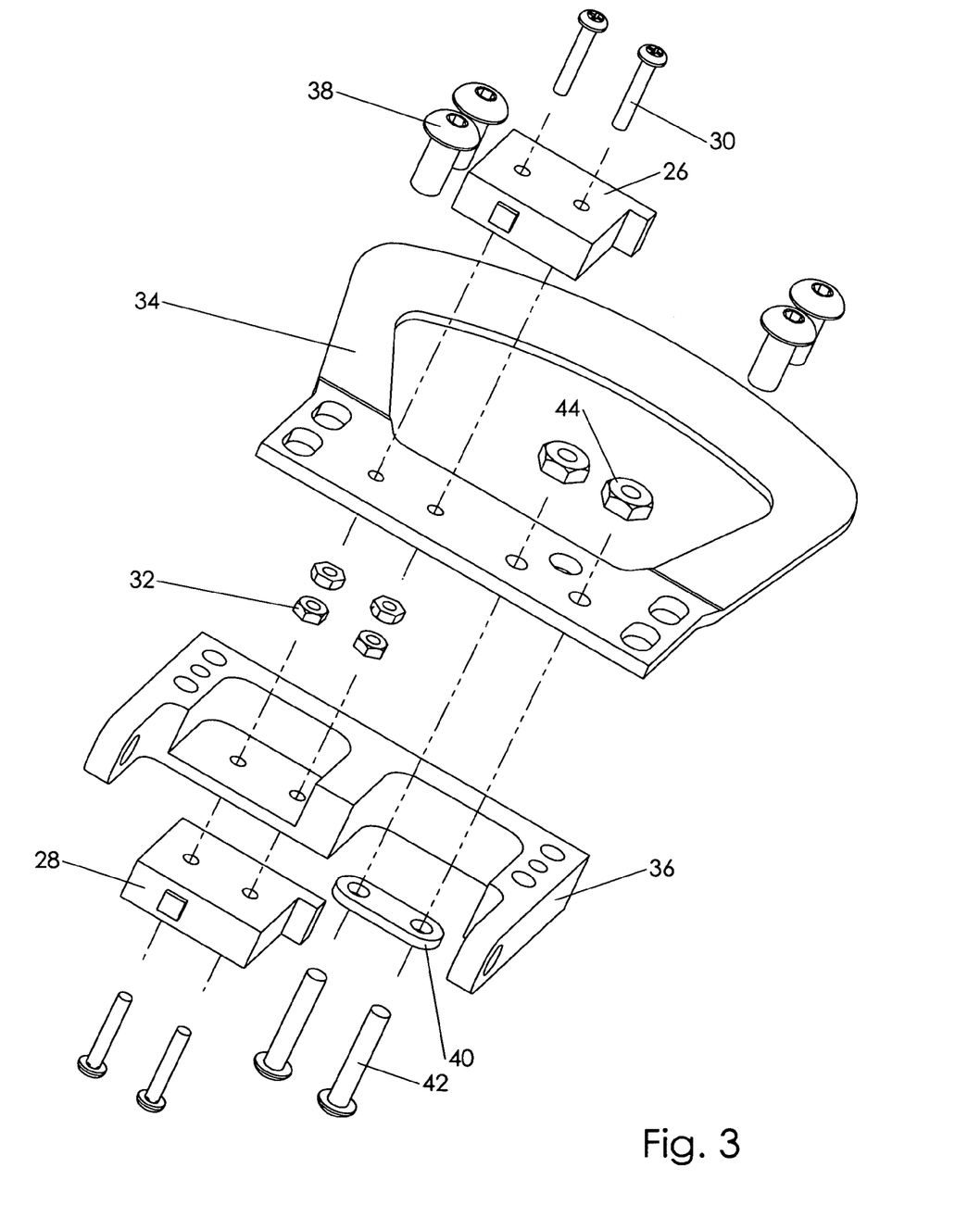
FIG. 3 is an exploded pictorial view of a two stage downshift paddle according to the invention.

A preferred embodiment of the shift system is illustrated in FIGS. 1 through 3. The clutch/downshift paddle 16 and the upshift paddle 14 are mounted to the paddle assembly base 12 by pivot shafts 18 which are retained by pivot shaft retaining circlips 24. The entire paddle assembly is mounted to the back of a steering wheel 10 with the clutch/downshift paddle 16 on the left side as viewed by the driver. The downshift stage return spring 22 and the clutch stage return spring 20 are mounted to be concentric with and retained by the pivot shaft 18. Both springs apply force with one spring arm against the paddle 16.

The clutch stage return spring 20 applies a lever returning force against the base 12 with one spring arm at all times. The downshift stage return spring 22 applies a lever returning force against the downshift spring contact boss 12A only after a certain amount of clutch/downshift paddle 16 actuation travel has been taken up, at the other times the spring arm force is applied to the downshift spring stop 40 which doesn't apply a returning force to the clutch/downshift paddle 16.

The paddle handle 34 is mounted to the paddle bracket 36 by four paddle attaching screws 38. The clutch actuation switch 26 is attached to the paddle handle 34 by two switch mounting screws 30 and two switch mounting nuts 32. The downshift actuation switching 28 is attached to the paddle bracket 36 by two switch mounting screws 30 and two switch mounting nuts 32. The downshift spring stop 40 is attached to the paddle handle 34 by two downshift spring stop screws 42 and two downshift spring stop adjusting nuts 44.

The dual stage input lever transmission downshift system is used to actuate both the clutch (not shown) and the downshift lever on the transmission (not shown) by operation of the respective switches 26, 28. It allows several actuations of the transmission downshift lever with only one disengagement and reengagement of the vehicle clutch.

Figure 4:
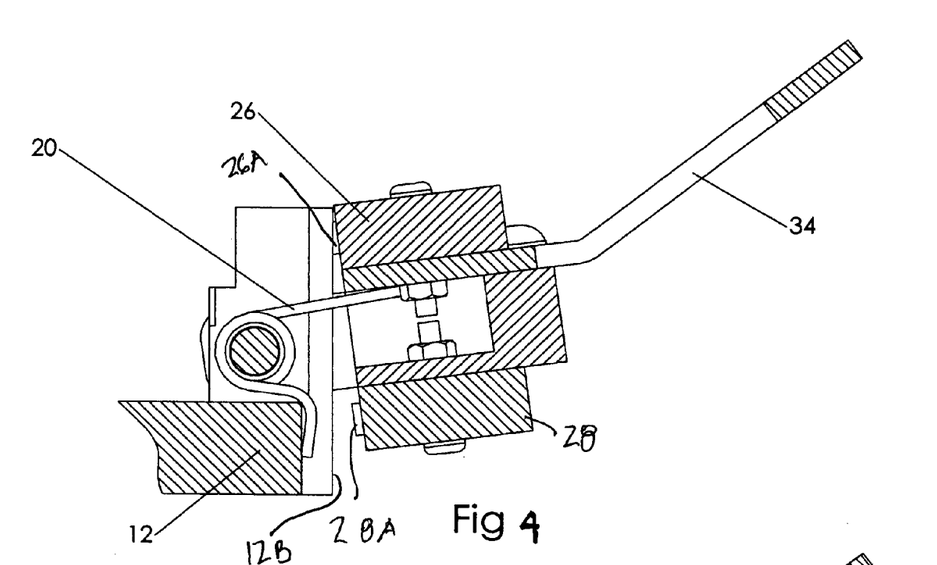
FIG. 4 is an enlarged cross-sectional view of components of the paddle assembly shown in FIGS. 1-3 depicting the clutch stage return spring.
Figure 5A:
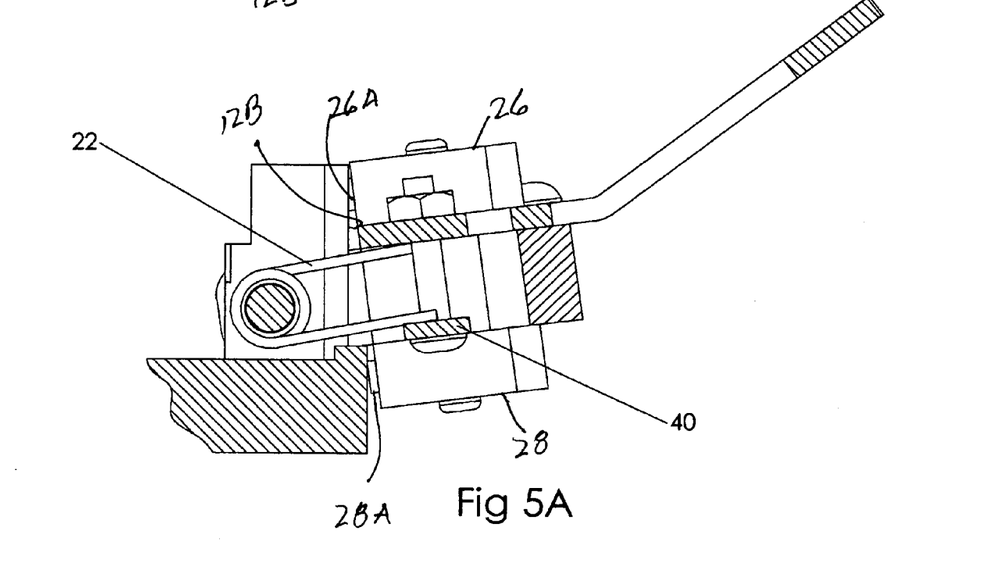
FIG. 5A through 5D are enlarged cross-sectional views of components of the paddle assembly displaying the downshift stage return spring at several different stages of actuation.

FIGS. 4 and 5A are cross-sectional views taken through different planes to illustrate the clutch stage return spring in FIG. 4 and the downshift stage return spring in FIG. 5A. Both figures show the clutch/downshift paddle 16 in its fully extended position where it would be resting when the driver is not applying a force to the paddle handle 34 which would pull it back towards the steering wheel which would be the downward direction in these figures. Clearly visible in FIG. 4 is one spring arm applying a force against the paddle handle 34 and the other spring arm applying a force to the paddle base 12. This spring 20 is constantly in torsion and provides the returning force that the driver feels when he first pulls against the paddle handle 34 with his fingers.

FIG. 5A illustrates the downshift stage return spring 22 with one spring arm applying a force against the paddle handle 34 and one arm applying a force against the spring stop 40. In this position the spring 22 does not apply a torque to the clutch/downshift paddle 16 and does not add to the returning force that the driver would feel when actuating the downshift paddle 16.

In FIG. 4 the clutch actuation switch 26 is illustrated in its actuated position with contact 26A depressed held against surface 12B, the switch 26 being open, not allowing current flow. The clutch is therefore engaged.

Figure 5B:
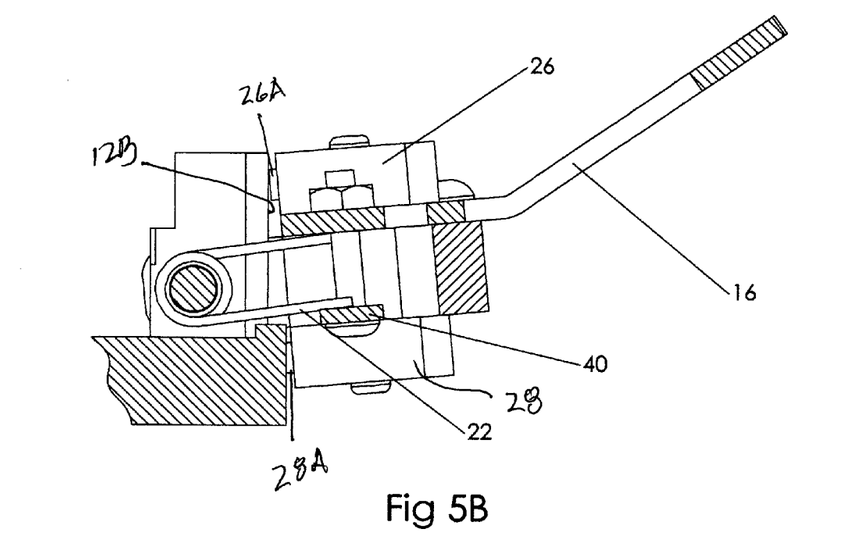

FIG. 5B is the same cross sectional view as FIG. 5A and illustrates the downshift paddle rotated 2.5 degrees as if pulled slightly by the driver's hand. At this point the clutch actuation switch contact 26 is no longer held in contact with surface 12B so the switch 26 is not actuated and is in its closed state allowing current flow through it and commanding disengagement of the clutch. Also illustrated is the downshift stage return spring 22 with one arm applying a force to the downshift spring stop 40 and not added to the downshift paddle returning torque felt by the driver.

Figure 5C:
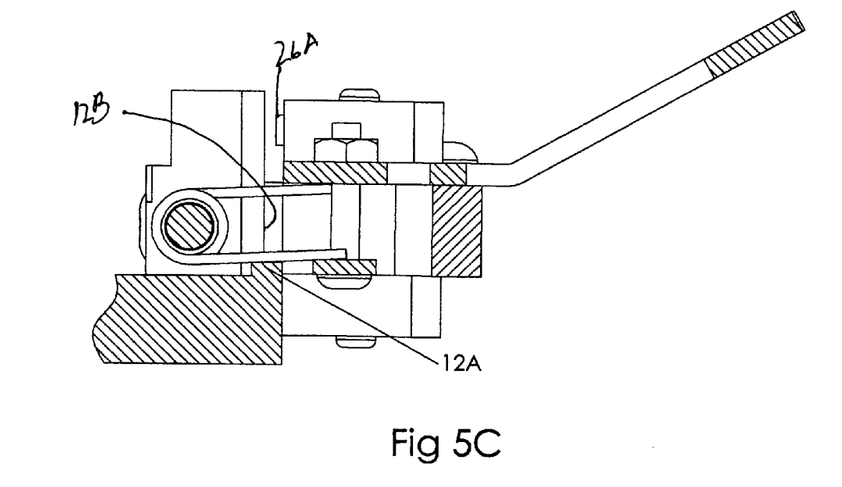

FIG. 5C shows a further 4.5 degrees of downshift paddle 16 pivoting travel and illustrates the spring arm of the downshift stage return spring 22 now contacting both the downshift spring stop 40 and the downshift spring contact boss 12A at the same time.

This position is the start of the second stage of downshift paddle travel, when the driver will feel a sudden increase in downshift paddle return torque as the downshift stage return spring 22 now applies a force to the downshift spring contact boss 12A, the spring when wound up adds its torque to the clutch deactivation stage return spring 20 torque. At this point the clutch actuation switch 26 is still deactivated and the downshift actuation switch 28 also remains deactivated.

Figure 5D:
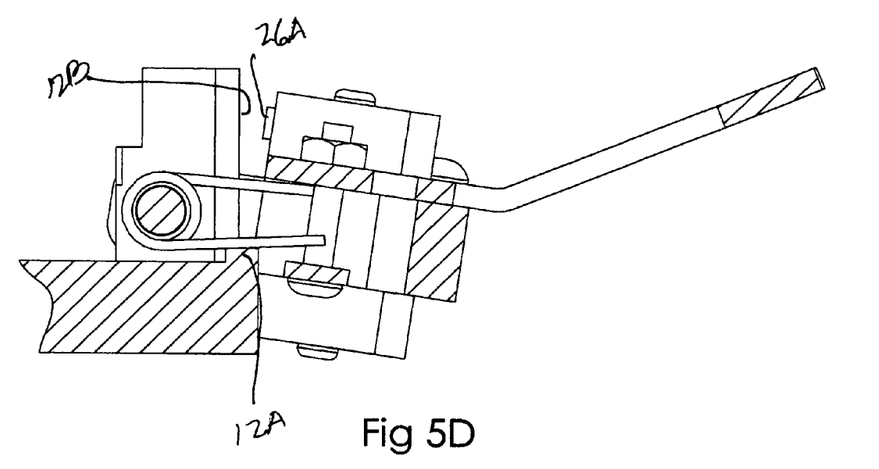

FIG. 5D illustrates the downshift paddle 16 rotated an additional 7.5 degrees at which point the downshift actuation switch 28 is activated by contact 28A being pushed against surface 12B and allows current to pass through it commanding a downshift event at the transmission. The downshift stage return spring arm 22 is no longer in contact with the downshift spring stop 40 and is only contacting the downshift spring contact boss 12A on the paddle base 12. The torques of both return springs 20, 22 are felt as a higher torque resistance during this stage of travel giving the driver a tactile feel indicating which stage the downshift paddle 16 is in.

To do multiple downshifts with one clutch disengagement, the driver would pull the downshift paddle 16 all the way to the position illustrated in FIG. 5D and then allow the paddle 16 to return back to towards its resting position until he felt significant change in return torque caused by the paddle 16 again returning to the position of FIG. 5C. At this point the driver would again pull the downshift paddle 16 all the way to the position illustrated in FIG. 5D which would cause another downshift event. Releasing the downshift paddle 16 completely would allow it to return to its position illustrated in FIGS. 4 and 5A at which point the clutch actuation switch would be reactivated by the contact 26A engaging surface 12B and the clutch would be reengaged. This allows two downshift events with only one disengagement of the clutch.

Figure 4A:
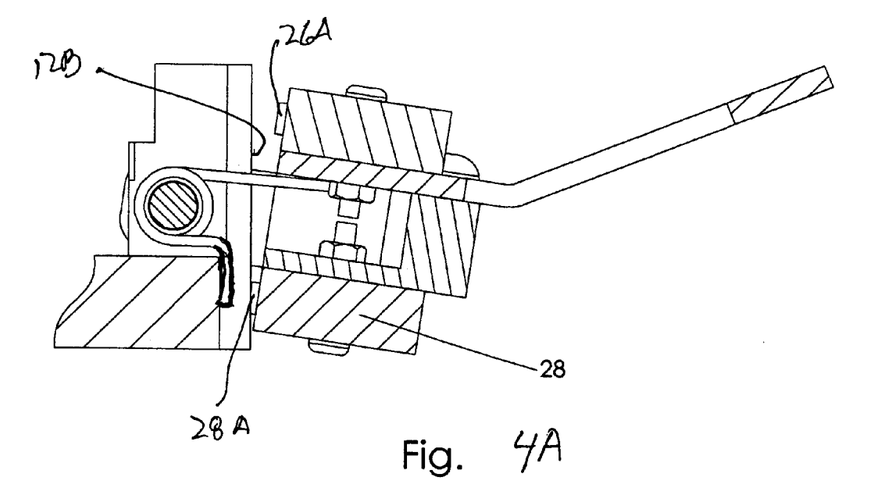
FIG. 4A is a cross-sectional view of the paddle assembly in the position of FIG. 5D but taken through the plane of the section of FIG. 4.

FIG. 4A illustrates the same downshift paddle angular position as in FIG. 5D, but is a cross-sectional view from the same plane as FIG. 4. This figure illustrates the activation of the downshift actuation switch 28 against the paddle base 12, the downshift actuation switch contact 26A at this point is not visible in FIGS. 5C and 5D because a view thereof is blocked by the downshift spring contact boss 12A.

The clutch actuation switch 26 and transmission downshift actuation switch 28 can be combined into a single switch device such as a potentiometer which causes switching to operate the vehicle clutch at one position and then switching to operate the transmission shifter at a more advanced position due to a higher electrical potential at the more advanced position.

Also, instead of separate springs, a single double spring rate spring arrangement can be used which increases the spring rate at a predetermined point in its compression or wind up.

REFERENCE NUMERALS IN DRAWINGS 10 steering wheel
12 paddle assembly base
12A downshift spring contact boss
12B switch contact engagement surface
14 right side (upshift paddle)
16 left side (clutch/downshift) paddle
18 pivot shaft
20 clutch stage return spring
22 downshift stage return spring
24 pivot shaft retaining circlips
26 clutch actuation switch
26A switch actuation switch contact
28 downshift actuation switch
28A downshift actuation switch contact
30 switch mounting screw
32 switch mounting nut
34 paddle handle
36 paddle bracket
38 paddle attaching screws
40 downshift spring stop
42 downshift spring stop screws
44 downshift spring stop adjusting nuts

The invention claimed is:

1. A control paddle assembly for manually controlling actuation of both a vehicle clutch actuation switch for a manually operated clutch and a vehicle manual transmission shifter actuation switch for a manual transmission comprising:

a paddle having said vehicle clutch and vehicle transmission shifter actuation switches mounted thereto, said paddle pivotally mounted to a base to be manually pivotable thereon through a range of pivot travel from a rest position to an advanced position;

a full range paddle return spring force generator arrangement acting upon the paddle throughout its range of pivoting travel;

said vehicle clutch actuation switch operated upon manual pivoting of said paddle away from said rest position to an intermediate position to disengage said manually operated clutch;

said vehicle transmission shifter actuation switch activated upon continued manual pivoting of said paddle past said intermediate position to said advanced position to cause shifting of said transmission each time said paddle is pivoted to said advanced position;

an advanced range paddle return spring force generator arrangement also acting on said paddle after pivoting said paddle past said intermediate position to generate an increased return force acting on said paddle upon manual pivoting of said paddle past said intermediate position, said increased return force giving an operator of the paddle a tactile indication of the paddle position upon passing said intermediate position and disengaging said manually operated clutch by operation of said vehicle actuation switch but before actuating said vehicle transmission shifter actuation switch, whereby said manually operated clutch can be maintained disengaged while repeated manual transmission shifts may be carried out by repeated pivoting of the paddle from a position past said intermediate position to said advanced position.

2. The control paddle assembly according to claim 1 wherein said full range and advanced range spring force generator are produced by two separate springs, a first spring which engages said paddle throughout its travel, and a second spring which engages said paddle so as to generate the increased return force only after said paddle reaches said intermediate position in said paddle's range of pivot travel.

3. The control paddle assembly according to claim 1 wherein said vehicle clutch actuation switch comprises a first switch and said vehicle transmission shifter actuation switch comprises a second switch separate from said first switch.

* * * * *